Figure 1:
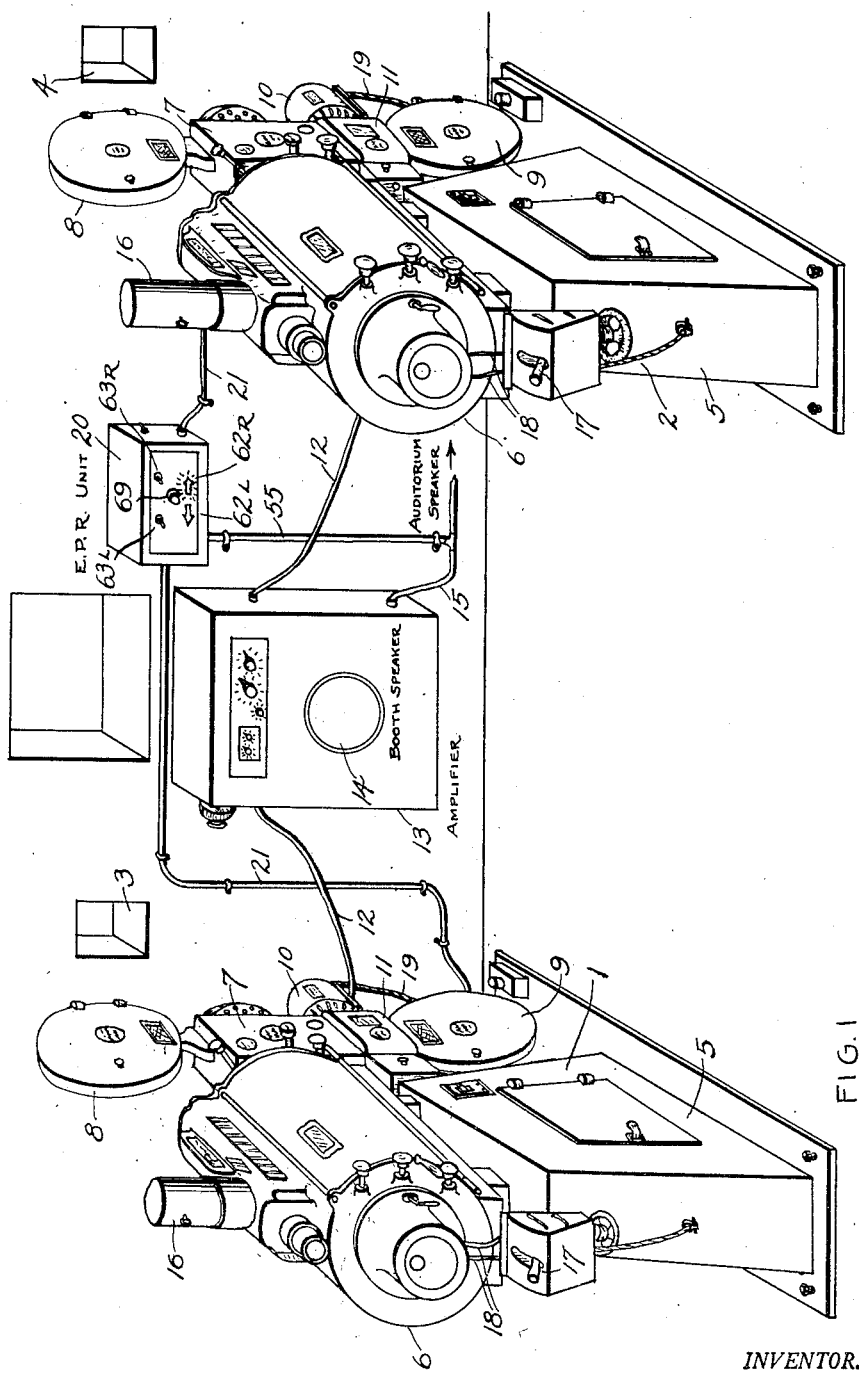

Feb. 20, 1951 J. T. GATES 2,542,188
CHANGE-OVER CONTROL
Filed May 27, 1948 3 Sheets-Sheet 1

INVENTOR.
JAMES T. GATES
BY
Russell C. Lane
ATTORNEY

Feb. 20, 1951　　　　　　　J. T. GATES　　　　　　　2,542,188
CHANGE-OVER CONTROL
Filed May 27, 1948　　　　　　　　　　　　　　3 Sheets-Sheet 3

INVENTOR.
JAMES T. GATES
BY
Russell C. Lane
ATTORNEY

Patented Feb. 20, 1951

2,542,188

UNITED STATES PATENT OFFICE 2,542,188

CHANGE-OVER CONTROL

James T. Gates, West Alexander, Ohio, assignor, by mesne assignments, to Machine Circuit Control Co., Cleveland, Ohio Application May 27, 1948, Serial No. 29,472

3 Claims. (Cl. 88—17)

This invention relates to the automatic operation of duplicate machines in repeating sequence, so that one machine may take up an installment operation at the conclusion of another installment by another machine.

The principal object of the invention is to provide for the sequential operation of machines, i. e., one after the other, without apparent interruption, the start of a succeeding machine being controlled by a signal or impulse occurring at or near the conclusion of the operation by a preceding machine.

An object in general is to control the sequential operation of a plurality of duplicate machines that have a limited operating cycle, shorter in time than the total of sequential operation, so that an uninterrupted machine operation of several machine cycles can be accomplished.

Another object of the invention is to provide for automatic and alternate operation of a plurality of strip driving machines, designed to be operated in sequence to drive or deliver a strip continuously for some multiple of the individual machine operating time, the start of one machine and the stop of another machine being determined by the progress of the driven strip and its effect upon a control unit electrically connected with both machines.

Specifically, it is an object of the invention to automatically control the sequential operation of a pair of movie projectors driving sound augmented picture films, so that the conclusion of one film and the start of another film will be so timed that the change in visual and or audible product will be non-apparent.

Therefore, a particular object of the invention is to provide a control unit for automatic changeover from one projector to another projector, the operation of which control unit is initiated by the conventional sound transposing devices of the active projector at or near the concluding end of a film being shown.

Another object of the invention is to provide an automatic change-over unit for control of moving picture machines, which unit is embodied in an individual cabinet and requires a minimum of connections into the projectors which it is to control, no one of the connections requiring mechanical alteration of the regular or conventional projector mechanism.

A further object of the invention is to provide a unit of the class described that embodies an electronic initiating circuit fired by a particular frequency signal acting upon the conventional sound pickup and requiring no additional pickup means.

A further object of the invention is to provide an automatic control unit initiated by a standard frequency sensitive relay, responsive to either subsonic or supersonic frequency, for effecting complete change-over from one projector to another.

A further object of the invention is to provide an automatic control unit for the sequential operation of two movie projectors, which unit responds to inaudible frequencies for initiating a progression of circuit closings making for the complete and unobserved substitution of one movie film for another.

A further object of the invention is to provide an automatic control unit for movie projector machines that require no mechanical attachments to or changes in the projector equipment, yet responds to a frequency signal or impulses occurring in the progress of operation by one machine for starting and conditioning the operation of the other machine, and the subsequent stopping of the first machine.

In commercial motion picture exhibitings, two or more motion picture projectors are used in conjunction with sound heads, film magazines, light houses and amplifier, for the sequential showing of a plurality of serially related films, whose total running time is some multiple of the film capacity of any one projection machine, and therefore requires the alternate operation of the two machines, one being reconditioned and checked for proper operation during its rest period, while the other is exhibiting the film. To accomplish a smoothly operating show, and produce a smooth continuity of pictures and sound commensurate with the intent of the film producer, it is necessary to properly time the start of a succeeding machine with respect to the run of a preceding machine, which involves the drive of the film, the energization of the projector lamp and sound pickup circuit on the succeeding machine, the application of projector light beam onto the film in the succeeding machine, and interruption of light beam on the film of the preceding machine before the preceding machine is stopped. Film producers have attempted to assist the operator in making the change-over as it is called by providing visual signals at designated portions on certain of the picture frames near the concluding end of the film, so that the operator may on the appearance of the first signal, start the projector motor and light source for the succeeding machine, and on the appearance of the second signal, usually about seven seconds later, change the sound supply from one machine to the other substantially coincident with changing the projector light beam from one machine to the other.

The minimum of action by the operator that must be packed into a time period of a few seconds in effecting a change-over, from an active machine to an inactive machine, involves starting the motor of the inactive machine along with the energization of the projector filament or arc of that machine. In each projector mechanism there is a heavy shutter member interposed between the light source and the film for protecting the film against the heat of the projector light source. These members, dousers as they are called, are operated electromagnetically so that they can be moved into and out of the path of the projector light beam at the proper moment so that the light beam is never allowed to fall upon a film that is not moving. The operator is therefore required to raise the douser from across the light beam in the inactive machine. Within a few seconds later the operator is required to open the change-over slide in the inactive machine, and close the change-over slide in the active machine. The change-over shutter is the last element in the path of the light beam to the film, and it is the element that determines whether or not the film being driven past the projector lense will be displayed upon the screen. The sound switch must also be operated to change from one sound track to the other. After the change-over shutter of the active machine has been closed the douser of the active machine must be moved into the path of the projector light beam. Finally, the projector motor of the active machine, and its projecting filament or arc must be extinguished, thus making some nine or ten separate and distinct operations that must be performed by the operator within a time period of about fifteen seconds.

The success of the method for manual changeover depends upon the operator of the projector machines being alert enough to catch the visual signal or signals, not having his attention drawn away by some other event at the instant of the signal, and his capability of quickly responding to the signals when displaced or observed. If either one of the signals is missed, or if one of the signals is slowly responded to, the timing of the manual change-over is all off and an awkward breach in the visual and audible rendition is the result. Hence, all that has so carefully been planned by the film producer is lost.

There are known to be automatic change-over mechanisms for sequentially operating movie projectors, but to the best of my knowledge, they are complicated and cumbersome in construction, require mechanical revision of the conventional projection machines and are not reliable in operation. Where those control units are initiated by the film, there is usually some necessary modification of the film that materially weakens it mechanically, or requires additional signal pickup means for the projector mechanism. The character of existing or proposed automatic changeover means is such that they can seldom if ever be connected with or attached to existing projection equipment without considerable reworking of the mechanism, and even when installed are so far from satisfactory in operation that close attention is still demanded from the operator who must stand by ready to complete manually what the control mechanism fails to do. Thus, the duties of the operator are not lessened, for he must be on the job and alert to malfunctioning of the mechanism, in order to provide a smooth running program.

It is therefore an important object of the invention to provide a moving picture changeover robot that comprises a self contained unit with proper electric connections to the two projector machines, that a circuit can be initiated by an inaudible frequency on the conventional sound track and by the conventional pickup of an operating machine to sequentially start the motor of an inactive machine; light the projection lamp of the inactive machine; and raise the douser of the inactive machine; then after an interval of some seven seconds raise the changeover shutter of the inactive machine and lower the changeover shutter of the active machine; change the sound from the active machine to the inactive machine; and lower the douser of the active machine; and finally after a period of some nine seconds more, stop the motor and shut off the projector lamp of the active machine, after which the automatic changeover is completed, to the extent that what was the inactive machine now becomes the active machine, and the active machine becomes inactive.

The disadvantages have been overcome, and the objects have been accomplished by providing a single self contained unit, easily and quickly attachable to a pair of existing projection machines by a pair of electric cables so as to have an initiating circuit set up by the customary sound head through a tap into the speaker outlet of the amplifier, the unit itself having a frequency sensitive relay for energizing an electronic circuit that effects operation of a cam driving motor that cycles after starting to effect the proper timed operation of switches embodied in electric circuits to the projector motors, the projection lamps, the dousers, the sound heads, the changeover shutters and indicator lamps for both machines. The excitation of the electronic circuit of the unit is effected by an inaudible frequency trace superimposed on or incorporated in the usual sound track so that no additional exciter lamp or other sound pickup device is needed, the signal to start the operation of the unit thereby being applied by the usual equipment to be detected by the frequency sensitive relay. The inaudible frequency trace may be superimposed upon, or incorporated in the usual sound track of the conventional movie film, where the unit is to control the sequential operation of moving picture projectors. On the other hand the inaudible frequency may be incorporated in the sound impressions of a magnetic wire record, a magnetic tape or ribbon, or even the groove of a disc record, that portion of the trace in either instance acting through appropriate pickup and amplifier means to deliver an impulse to the frequency relay. Alternatives for those frequency traces might include perforated tapes or webs in combination with electrical or mechanical means to transpose the apertures, or perhaps notches, to electrical impulses for the frequency sensitive relay. Obviously, other means may be used for generating the particular controlling frequency, and include mechanical interrupters, which when set into operation, start the changeover unit on its cycle of operation. Either a subsonic frequency or a supersonic frequency may be used for the initiating signal, since neither one will materially disturb the audition of the sound program. It is preferred, however, that the supersonic trace be used since it is less likely to produce a "thump" or like sound in the speaker upon its presentation to the sound pickup device. When the cam driving motor starts it establishes its own energizing circuit to release the action of the electronic initiating circuit, and the motor after it has operated through its cycle to effect the sequential operation of the several devices, stops to reestablish its condition for subsequent operation to effect a repeating changeover operation, there being required only another closing of the electronic initiating circuit.

A better understanding of my invention will be obtained and other objects, features, and advantages of my invention will appear from the following description taken in connection with the accompanying drawing and subtended claims.

Figure 2:
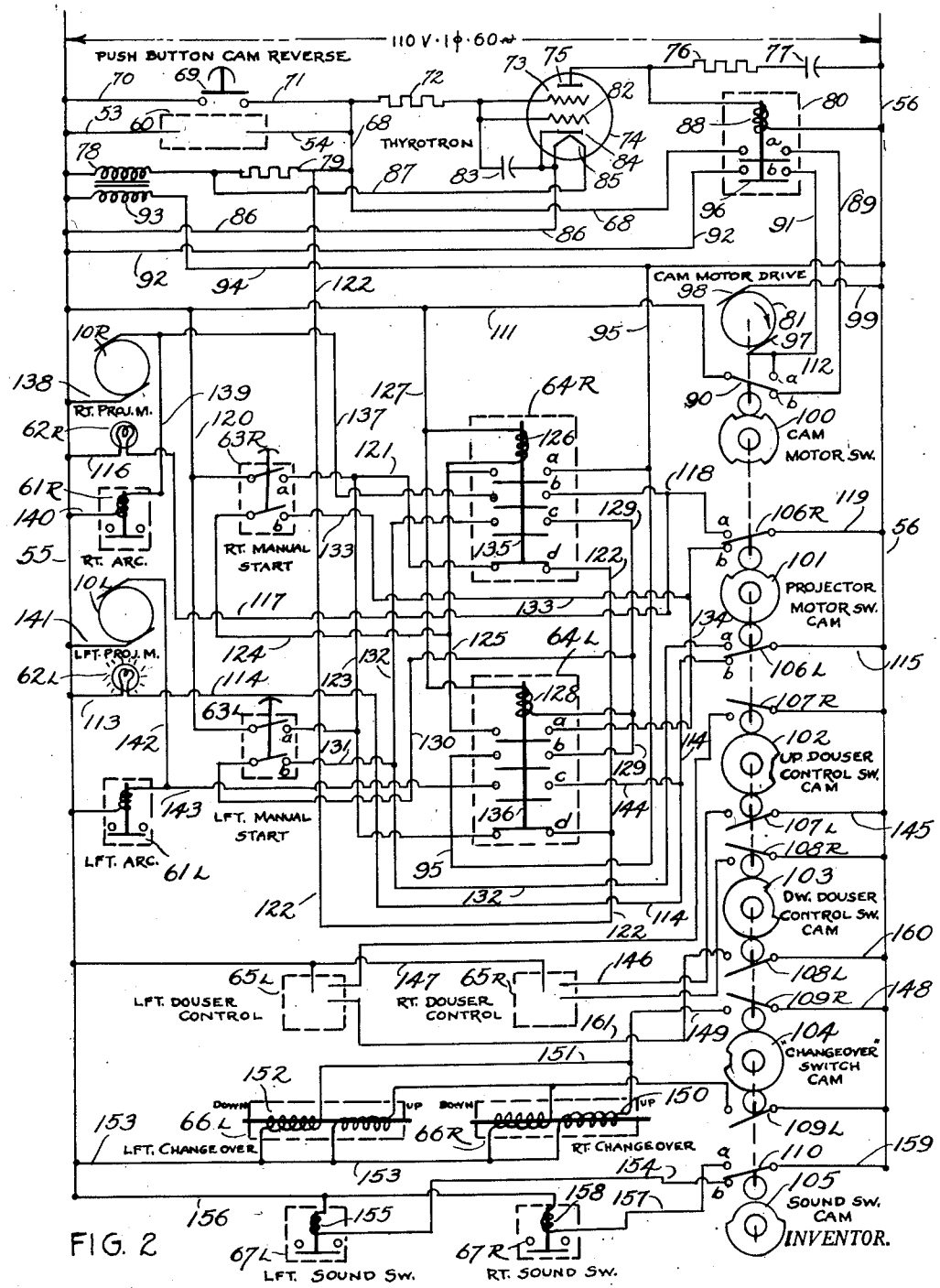

In the drawings:

Fig. 1 is a generally perspective view of a projection booth showing a pair of moving picture projecting machines and control unit therefor, whereby serially composited films may be continuously shown without interruption, by automatic starting of one projector prior to the cessation of operation of the other. Fig. 2 is a circuit diagram of the control unit by which the automatic changeover from one projector to another is accomplished.

Figure 3:
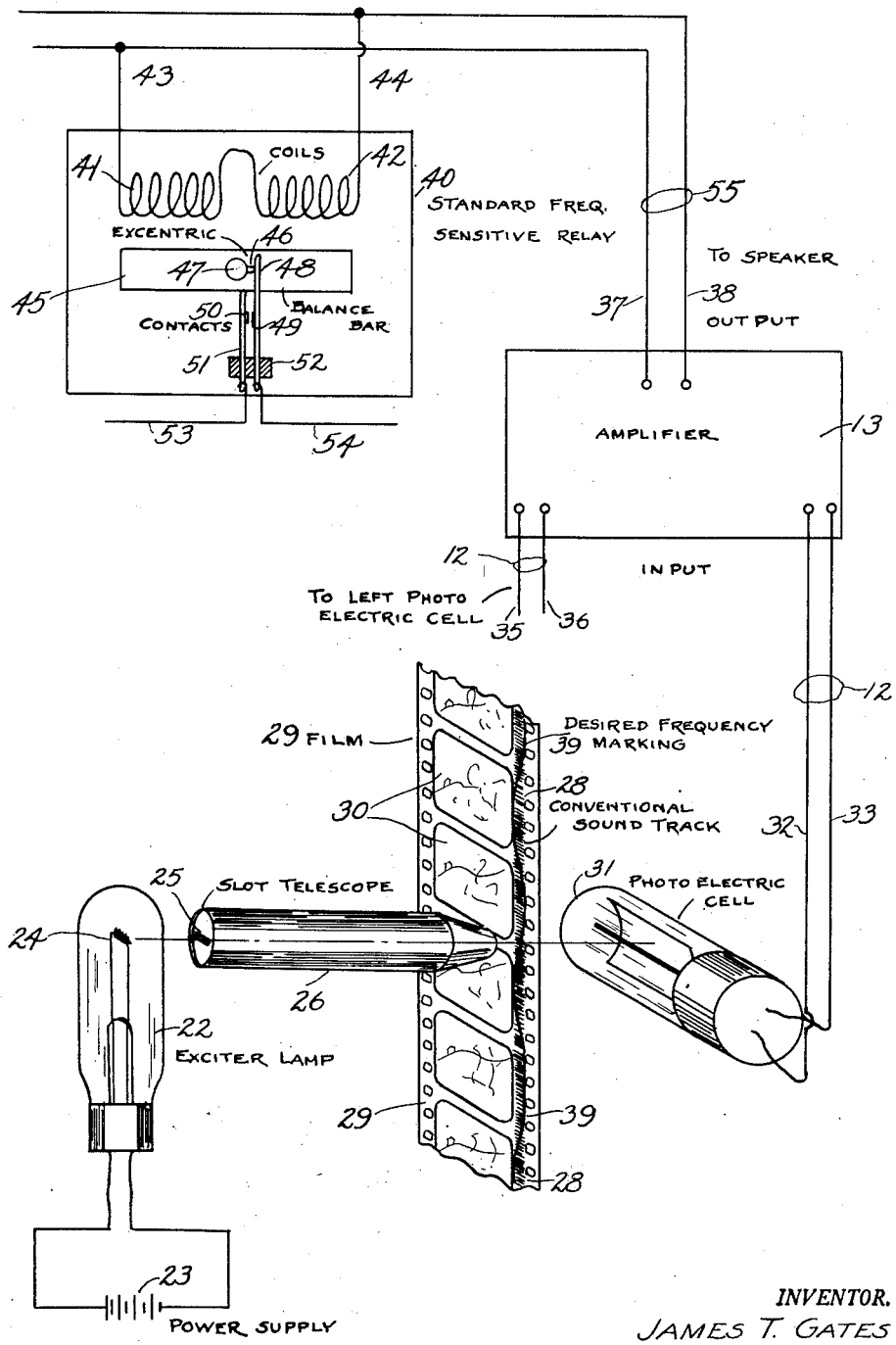

Fig. 3 is a schematic view of the initiating means by which the train of events leading to the start of the second projector is accomplished.

With reference to the drawings, first with reference to Fig. 1, the reference numerals 1 and 2 refer to two moving picture projectors of conventional structure adapted to project an image through openings 3 and 4 respectively, of a projection booth, on an appropriate screen associated with loud speakers at one end of an auditorium, hall or the like. The two machines at the left and at the right of the booth are essentially alike wherefor detailed description of one will suffice for both. Each projector comprises a base 5 supporting a lamp housing 6 adapted to cast a beam of light through a film compartment 7 traversed by a film paying out from a supply reel in magazine 8 to a take-up reel in magazine 9 through the operation of an electric motor 10, also driving a sound head 11 by which sound is delivered through cable 12 to a sound amplifier 13 having a booth speaker 14 and leading by cable 15 to the auditorium speakers not shown. The lamp housing 6 is fitted with the conventional stack 16 for venting the arcs or other light producing elements, and an electric line of proper voltage is led to the projector for its operation, and may include a switch 17 controlling current in leads 18, while an electric lead 19 supplies current to the motor 10 driving the sound-head 11, and is under control of my improved electronic robot 20 through a control cable 21 as will presently appear. Each projector 1 or 2 is thereby adapted when energized, to wind film off from the reel in magazine 8 and move it over the lens and shutter in compartment 7, and through the sound head 11 to the take-up reel in the magazine 9. The picture on the film is projected through the opening 3 or 4 upon the screen, and the sound track at the edge of the film is transformed into the audible product and reproduced by the speakers over the cable 15.

Conventionally, photo-electric means are employed for transposing the sound track to the audible product, and includes as shown in Fig. 3 an exciter lamp 22 with a power supply 23 causing the filament 24 to glow, and which shines through a slot 25 of a light telescope or tube 26 to cast in a beam upon a sound track 28 at the edge of a film 29 having a series of picture frames 30 to be projected on the screen. The sound track 28 permits more or less light from the filament 24 to reach a photo-electric cell 31 causing a current variation in leads 32, 33 by which the cell 31 is connected to the amplifier 13, leads 35 and 36 similarly connecting with the cell 31 of the other projector, the amplifier 13 having output leads 37, 38 in the cable 15 connecting with the loud speakers. However, other forms of sound pickup may be used where desired.

One form of the sound track 28, as is well known to those experienced in the art, is applied to the film in timed relation to the picture frames 30, particularly where there is any interrelation between them, such as conversation and action, though this timing relation is not in adjacent relation due to the fact that the light beam from the projection lamp and the sound head are lineally spaced along the run of the film as it passes through the projector. In conventional machines, the douser is disposable between the filament or arc and a slide or shutter next adjacent the film, and both of which must be moved to one side of the light beam before the design on the picture frame can be projected upon the screen. Unless the film is moving, it is necessary that the douser be in such position that the light beam be prevented from reaching the film, else the film will be burned, scorched or otherwise injured in a very short time. Therefore, during a changeover from one projector to another, it is essential that the douser be removed from across the light beam of the machine to be next operated, and be placed across the light beam of the machine to be discontinued, at just the right moment. Further, for smooth program operation, it is necessary that the changeover from one machine to the other, which is really a change from one roll of film to another, be made in such manner that there will be no interruption in either picture sequence or audible rendition. For changeover, in addition to douser manipulation, there must be lighting of one lamp and extinguishing of the other, start of one projector motor and stop of the other, withdrawal of one change-over slide and replacement of the other, and the connection of one sound head and the disconnection of the other.

It is the purpose of this invention to accomplish all of these acts in proper sequence so that the changeover from a picture series and sound on one film 29 to that of a second film can be made automatically without any noticeable interruption of either sound or picture, and to initiate that changeover by the last end of the film being projected. That initiation is effected by placing on the film sound track a special frequency marking superimposed upon or combined with the regular sound track so as to be detected by the usual sound pickup. The sound frequency may be one substantially below the range of the human ear, say about 12 cycles per second, such as indicated at 39 in Fig. 3, where it appears as a sinusoidal line over the usual sound track 28 at the right of the film 29. A supersonic frequency also may be used. When that frequency trace is presented in front of the light beam from the filament 24, the cell 31 will respond in the usual manner, and current will flow to and through the amplifier 13 to the speaker output 37, 38, but will not be audibly reproduced by the speakers. That frequency will, however, be picked up by the standard frequency relay 40, which has the coils 41 and 42 serially connected and joined by leads 43, 44 to the speaker wires, 37, 38, so that occurrence of the selected frequency will effect swing of the astatically balanced magnet bar 45. This bar is normally in balance so that a pin 46 on the axle 47 holds a spring leaf 48 having a contact 49 out of engagement with a fixed contact 50 carried by a bracket 51. The members 48, and 51 are mounted in an insulator 52 and are respectively joined to electrical leads 53, 54 for primary control of current flowing therein, as will presently appear. The frequency relay 40 designedly is mounted within the cabinet 20 for the robot, with the leads 43, 44 formed into the cable connection 55 joining the cable 15 carrying the wires 37, 38 extending from the amplifier to the speakers. Thus, the input to the control unit is from the output of the amplifier for the sound track. The means disclosed in Fig. 3, therefore provide an automatic control for the changeover unit, which control is indicated generally by the dashed rectangle indicated at 60 in Fig. 2, showing schematically the circuits and relations of the elements of the projectors to be controlled during the changeover.

Referring particularly to Fig. 2, a suitable source of electrical energy is supplied by the lines 55 and 56 across which the motors 10R and 10L for the right and left projectors are connected through proper switches as will presently appear. Also, connected across these lines 55, 56 with appropriate switches, are right and left arc lighting relays 61R and 61L, right and left indicator lamps 62R, 62L, right and left manual start switches 63R, 63L, right and left relay gang switches 64R, 64L, right and left douser control units 65R, 65L, right and left changeover units 66R, 66L, and right and left sound connecting switches 67R, 67L, all as will presently appear. The automatic initiator 60 is connected into the control circuit by the lead 53 joined to the line 55 and its lead 54 connected to 68 in parallel with a manual cam selector switch 69 inserted between wires 70, 71 joining line 55 and a resistance 72 connected with the suppressor grid 73 of a vacuum or other tube 74 whose plate 75 connects to the line 56 through a load resistor 76 and condenser 77. Also in parallel with the unit 60 and the manual switch 69 there is a secondary winding 78 of a transformer one end of which connects to the line 55, and the other end of which secondary connects with a resistor 79 connected to 68 which leads to one of the terminals $a$ of a relay switch 80 for control of a cam driving motor 81. A signal grid 82 of the tube 74 is connected with the suppressor grid 73 and through a condenser 83 with a cathode 84 of the tube in turn connected with the filament 85 having leads 86, 87 connected to the line 55 and between the secondary 78 and resistor 79 respectively. The relay switch 80 has its winding 88 connected at one end with the line 56 and the other end connected between the plate 75 and the resistor 76, while the second contact of the pair $a$ connects by lead 89 with a contact $b$ of a cam motor switch 90 adapted to engage a contact $a$ connected with a brush of the motor 81 and also by a lead 91 to one contact $b$ of a pair of contacts controlled by the relay switch 80, the other contact $b$ of the pair having connection by wire 92 with the line 55. A primary transformer winding 93 at one end joins line 55 and extends by wire 94 to the line 56, and has a branch 95 extending to connect with certain of the contacts of the relay gang switches 64R and 64L as will presently appear.

Thus the cam selector switch 69 and the automatic initiated switch 60 provide alternative means for starting the changeover cycle, in that either one of them on being closed effects firing of the tube 74 whose plate circuit includes the relay winding 88 of the relay switch 80, that controls the operation of the cam motor 81. The cathode 84 and filament 85 are connected together and are energized through the secondary winding 78 of the transformer with which they are serially connected, while the grids 73 and 82 are connected together to effect a simple gas triode responding promptly to a signal input from either closing of 60 or 69. Closing of either 60 or 69 furnishes current to the circuit of the tube 74. The grids becoming charged initiate electron movement to the plate 75 effecting current flow through a relay winding 88 to the line 56, causing rise of the movable element 96 of the relay 80 to close sets of contacts $a$ and $b$. Condensers 83 and 77 hold the current charge to the tube 74 assuring continued energization of high resistance coil 88 of the relay 80. Resistors 72 and 76 regulate the amount of low voltage desired to set the thyratron tube 74 into action upon completion of the circuit. As shown, closing of the contacts $a$ and $b$ of the relay 80, connects the cam driving motor 81 directly across the lines 55 and 56 by leads 92, contacts $b$ and element 96, wire 91 to brush 97 and from brush 98 through 99 to the line 56. The cam driving motor 81 through its shaft, and reduction gearing if desired, drives a plurality of switch operating cams, such as cam 100 for the cam motor switch 90, the cam 101 for the projector motor switches 106R and 106L, the cam 102 for the up-douser control switches 107R and 107L, the cam 103 for the down-douser control switches 108R and 108L, the cam 104 for the changeover switches 109R and 109L, and the cam 105 for the sound switch 110. Each of these switches 106R to 110 is appropriately connected to the line 56 and is adapted to engage one or another of pairs of contacts on movement of an actuating follower responding to the rotation of the respective cam driven in a clockwise direction by the cam driving motor 81.

Closing of the initiating circuit at either 60 or 69 will effect energization of the motor 81 as has been described, and when it operates it drives the cams through 180 degrees, whereupon the motor stops unless again energized. Very soon after the motor 81 starts the cam 100 rotates sufficiently to actuate the follower and move the switch 90 from contact $b$ to contact $a$ which makes the motor circuit self sustaining through a connection 111 joined to line 55 and switch 90, the contact $a$, branch 112 connecting it with 91, and thence by brush 97, 98 and 99 to line 56. When the cam 100 rotates through half a turn to the opposite notch it will permit the switch 90 to return to engagement with the contact $b$ and by this time, the circuits through 60 or 69 having been opened, the cam driving motor 81 will stop. If the proper one of the control switches 63R or 63L is closed while the cam driving motor 81 is operating, the rotation of the several cams will effect the several acts of a changeover in proper timed sequence, but if both the control switches are open when the motor operates, then the cams will rotate 180 degrees without effecting any changeover. As shown in Fig. 2, the circuit is set for the right projector to be started into operation. This is indicated by the fact that the indicator light 62L is bright. It has a circuit completed from the line 55 to 56 by the lead 113, wire 114 to contact b of switch 106L, and lead 115 to line 56. The signal light 62R is likewise connected to line 55 by lead 116 and wires 117 joined to 118 that connects to contact a of switch 106R and by 119 to 56.

The circuit as shown in Fig. 2 is as it exists during the quiet period of both projectors, but in a condition to start the right projector, as at the start of the day's program. To start the right projector at the beginning of the program, the right manual start switch 63R is closed which bridges two sets of contacts a and b. Contacts a are attached to lead 120 joining 111, and 121 connecting to one normally closed contact d of gang relay 64R, whose other contact d is connected by 122 to resistor 79 and lead 68. The contacts d of gang relay switch 64L are also connected to 122 and by 123 to 121 with a branch connected to contact a of manual start switch 63L, the second contact a of this switch connecting with 129 to 111. Manual start switch 63R being closed the circuit established permits current to pass from 55, through 111, 120, contacts a, connection 121, contacts d of 64R, 122 to the tube 74, the operation of which has been described, for driving the motor 81. The manual start switch 63L if closed, would do the same thing. One of the contacts b of the manual start switch 63R connects by 124 with 125 connecting to one contact a of both pair in gang relay switches 64R and 64L, and also connects with relay winding 126 of relay 64R. A branch 127 from 111 connects coil winding 126 and a similar coil winding 128 for gang relay 64L, after which it joins a line 129. The line 129 connects one contact c of gang relay 64R and one contact b of gang relay 64L with a branch 130 connecting to one of the contacts b of manual start switch 63L, the other b contact of which leads by 131 to 132 connecting the other contact c of relay gang switch 64R with contact a of projector motor switch 106L. The second contact b for the manual start switch 63R connects by 133 with 134 joined to contact b of projector motor switch 106R and to one contact a of relay gang switch 64L, the other contact a of which is connected to 125 as has been described.

Thus, while the contacts a of the manual start switches 63R and 63L, when closed, supply current to the circuit for the tube 74, the contacts b of those start switches supply current to the respective relay coil for moving the bridging conductor 135 or 136 to open the closed contacts at d, and to close the pairs of contacts at a, b, and c. The circuit for relay 64R includes line 55, wires 111, 127, coil 126, wires 125, 124, contacts b of 63R, 133, 134, contact b, switch 106R, and 119 to 56. For relay 64L, it would include 111, 127, 128, 129, 130, contacts b, 131, 132, a, 106L and 115 to 56.

Electric energy in the relay coils 126 or 128 operates to close the several sets of contacts a, b, and c so that the motor driven cams now in operation, actuate their respective switches and control their respective circuits. As soon as either relay gang switch is operated, raising of the bridging member 135 or 136 will open the contacts at d which supplies current to the circuit of tube 74, allowing that tube and relay 80 to drop out. The energy circuit for the cam driving motor 81 will by that time have been completed through 55, 111, 90, a, 112, 97, 98, and 99 to 56, which allows the motor to run until the opposite notch of cam 100 permits the switch 90 to return to contact b. By that time the bridging contact 96 of relay switch 80 will have dropped to open contacts a and b, discontinuing current which has been supplied through 91 and 92 to the motor 81. All of the cams, 100 to 105, will have turned through 180 degrees, or have turned half way around.

For the purpose of the assumption, that the right hand projector is started at the beginning of the daily program, rotation of the cam 101 will operate switch 106R to move from contact b to contact a which connects through 118, contacts a and 135 of 64R, then through 137 to motor 10R and 138 to 55, a branch 139 leading to and through arc lamp switch 61R and 140 to 55. The branch 117 joining 118 leads to the indicator lamp 62R designating that the right projector motor 10R is running, and that the associated lamp arc or filament is burning. By the time that the cams rotate through the half turn the associated douser, changeover slide and sound head will have been set into proper operation for showing the pictures and rendering the sound effects carried by the film 29. At the beginning of the program, had it been desired to start the left projector first, that could have been done by closing the push button switch 69 until the motor 81 rotates the cams through a half turn which would be indicated by the other pilot light 62R burning. Then closing the left manual start switch 63L would effect starting of the left hand projector in the same manner that has been described for the right projector.

The automatic changeover from one projector to the other takes place near the conclusion of the film being shown. With reference to Fig. 2, it is again assumed, for the pertinent description, that the left projector is operating and that automatic change is to be made to the right projector. As the motor 10L drives the film and winds it up on the take-up reel 8, the specially designated frequency markings 39 are presented before the photocell and give the signal to the amplifier and frequency responsive relay 40 which starts the initiating circuit through the tube 74 to start the cam driving motor 81 as has been described. In this action, there must be at least a momentary closing of the initiating circuit of such length that the relay 80 operates to close both sets of a and b contacts. Contacts a of relay 80, when closed complete a circuit for the tube 74 in parallel with switches 60 and 69, by means of connection 111, extending from line 55 to switch 90, contact b, lead 69 to one of contacts a of relay, bridge member 96, second contact a, connection 68, resistor 72 to grids 73, 82 and cathode 94 of tube 74. The closing of contacts a of relay 80 also operates to close a circuit from 68, through a, and 89, b, 90, 111, 27, 126, 125, contacts a and bridge member 136 of 64L, 134 to contact b of 105R and 119 to 56, and thus actuating gang switch 64R to a closed position. Contact b of relay 80, when closed completes the motor circuit from 55 by way of 92, contacts b and bridge 95 to 91, thence brushes 97, 98 and branch 99 to 56. By the assumption, the left projector is in operation. Hence the left projector motor 10L is energized through 141, 142 and 143 to one of the contacts c of relay gang switch L, then bridge member 136 and second contact c to 144 and 114 to contact b of switch 106L and 115 to 56. The plunger 136 of relay gang switch 64L is raised so that the pairs of contacts a, b, and c, thereof are closed, contacts b thereof forming a holding circuit for the relay coil 128, which, while the left projector is operating through 111 from 55 to 127, 128, 129, b of 64L, b and 95 to 94 returning to 56.

Thus operation of the cam driving motor 81 drives the cams 100 to 105 in a clockwise direction, and aside from controlling its own circuit by the cam 100, which shifts switch 90 from contact b to a for energizing the coil 126 of gang relay 64R, so that sets of contacts a, b, and c may be closed, then operates the projector motor switch 106R by the rotation of the cam 101. Switch 106R moves from contact b to contact a, which connects on the one hand by 118 to contacts b of 64R now closed, 137 to motor 10R and 138 to line 55, and by 139 to lamp switch 61R and 140 to line 55, and on the other hand by 118, 117 to pilot light 62R and 116 to line 55, the switch 106R having a connection 119 to line 56 for completion of the circuit across the lines 55, 56. Up to this point then, the operation of the motor driven cams has effected the start of the right projector motor 10R, with an attendant lighting of the right arc lamp through the closing of 61R, which is indicated by the burning of the right pilot lamp 62R. At about the same time, the up-douser control cam 102 rotates to such position that switch 107L closes to connect 56 through 145, 146 to right douser control 65R, raising the right douser. A common connection 147 to the right and left douser control 65R and 65L joins line 55. The right douser being up, permits light to pass to the closed changeover slide which is immediately next to the traveling film and between the film and the light source.

After an interval of about seven seconds from the start of the projector motor, cam 104 rotates far enough that changeover switch 109R is closed so that lead 140 joining 56 is connected by 149 to an up-changeover coil 150 of unit 66R, and by branch 151 to a down changeover coil 152 of unit 66L and thence by return 153 to line 55. Thus, as the right changeover shutter is opened the left one is closed, both actions of which are substantially coincident with the switching of sound from the left film to the right film accomplished by the rotation of cam 105. The rotation of cam 105 shifts switch 110 from contact b where it was connected by 154 to solenoid 155 of left sound switch 67L and thence 156 to 55, to contact a by which it is now connected through 157 to solenoid 158 of right sound switch 67R and thence 156 to 55, the switch 110 having a lead 159 connecting it to line 56. A further substantially coincident operation is the down or closing movement of the left douser which is effected by the rotation of cam 103 that allows switch 108L to close completing a connection through 160 joining 56, and 161 to the left douser control 64L that has a return connection by 147 to line 55.

Approximately nine seconds later the left projector motor 10L, left arc lamp and left pilot light are shut off by the rotation of cam 101 to such point that switch 106L now moves from contact b to a which first opens circuit to the pilot light 62L directly connected through 114 and 113, and also opens circuit to the motor 10L and arc switch 61L that had been connected through 114, 144 and contacts c of gang switch 64L. Movement of the switch 106L from contact a to contact b is preparatory for subsequent operation of the automatic changeover from right projector to left projector and has to do principally with setting up circuit connections for the operation upon the start of the cam driving motor by another impulse through automatic switch 60. The train of cams has now reached the end of its cycle since the cam 100 has rotated the full half turn and now again occupies the position illustrated in Fig. 2, where switch 90 has returned to contact b leaving the circuit to motor 81 open since the contacts a and b of relay 80 are now also open. The entire process of changing from operation by the left projector to operation by the right projector has now been made, and has been followed by the stopping of the left projector and conditioning of the unit 20 to respond to the frequency markings on the sound track of the film now being run, for duplicate changeover to the left projector at or near the conclusion of the run on the right projector. In other words, once one of the projectors is started at the beginning of the show, either the right or the left machine, the projectors from then on become automatic through initiating impulses as described with respect to Fig. 3, which start the unit 20 that effects the complete changeover. All that is now required of the operator is to load and unload the film magazines 8 and 9 of the idle machine, thread the film through the idle machine, and other details necessary or incident to its maintenance for operation when its cycle of operation is started by the unit 20.

From the foregoing description it will be apparent that various modifications may be made in my invention without departing from the spirit and scope thereof and I desire, therefore, that only such limitations shall be placed thereon as are necessitated by the prior art and set forth in the appended claims.

I claim:

1. In a control unit for sequentially starting either one of a pair of moving picture machines, in which each machine is adapted to drive and reproduce a sound augmented film by an amplifier and speaker common to both machines, a source of electric current for the machines, a change-over robot effecting the start of one machine and then the successive start of either machine at the near conclusion of the run of said one machine, said robot including a pair of motor driven switch operating cams, electric switch devices operated by each cam for alternately energizing the projector driving motors, a cam driving motor connectible with the current source for rotating the cams through a predetermined cycle, means for initiating a circuit through the cam driving motor, means associating and connecting one of the switch operating cams and a plurality of switch operating devices into a pair of parallel and substantially identical projector motor control circuits, each of said projector motor control circuits including a cam operated cycling switch, a solenoid operated conditioning switch and a manually operated start switch; each of said cycling switches having a movable contact adapted to alternately engage a projector motor energizing circuit contact for the respective one of said parallel circuits, and a solenoid circuit completing contact for the respective one of said parallel circuits; each of said conditioning switches being a gang switch providing a pair of normally open solenoid holding circuit contacts for the respective one of said parallel circuits, a pair of normally open projector motor energizing circuit contacts for the respective one of said parallel circuits, a pair of normally open solenoid energizing circuit contacts for the alternate one of said parallel circuits, and a pair of normally closed initiating circuit contacts for the respective one of said parallel circuits and connected in parallel with the normally closed initiating circuit contacts of the alternate one of said parallel circuits; each of said manually operated start switches having a first pair of initiating circuit contacts in series with the normally closed initiating circuit contacts of the conditioning switch in both the respective one and the alternate one of said parallel circuits, and a second pair of solenoid circuit completing contacts for the respective one of said parallel circuits and connected in parallel with the said solenoid energizing circuit contacts of the conditioning switch in the alternate one of the said parallel circuits; and means whereby completion of the initiating circuit through one of the manually operated start switches selects the respective one of the said parallel projector motor control circuits to be completed, and said manual start switch temporarily energizes the cam driving motor circuit to effect the operation cycle, and means including one of said switch devices operated by the cam driving motor for establishing a cam driving motor running circuit to complete the predetermined cycle of rotating cams.

2. The combination set forth in claim 1 wherein either of the manually operated start switches when closed completes a circuit across the current source through the normally closed contacts of either of the solenoid actuated conditioning switches for completing the initiating circuit, an electronic control circuit fired by the initiating circuit which in turn effects the operation of said cam operating motor.

3. In a control circuit for sequentially starting either one of a pair of machines, the combination comprising, means operated by each machine when running for developing an amplified audible frequency mixed with an inaudible signal frequency significant of machine operation, means translating the amplified audible frequency to an audible stage, pick-off means exposed to the amplified mixed audible frequency and inaudible frequency signal before translated to the audible stage for isolating the signal frequency, a change-over robot responsive to the isolated signal frequency for effecting the start of one machine near the conclusion of the run of the other machine, said robot including a pair of cycling switches, a pair of conditioning switches, each having connection with identical elements of a respective machine for performance of the starting of a respective machine and stopping of an alternate machine, a plurality of switch operating cams, one for the pair of cycling switches, motor means driving the plurality of cams in timed relation for reversely actuating the pair of cycling switches, each of said cycling switches having a machine energizing circuit contact in series with a pair of machine energizing circuit contacts of the respective conditioning switch which when both closed effect energization of the respective machine, each of said cycling switches also having a second circuit closing contact with means connecting it with a second pair of contacts in the alternate conditioning switch, a solenoid for actuating each conditioning switch to close both pair of said contacts, means selectively connecting each solenoid with the current source and with the said second contact of the respective cycling switch, and means directly connecting each solenoid with the said second pair of contacts in the alternate conditioning switch, whereby reverse actuation of the cycling switches maintains both conditioning switch solenoids energized, and alternately closes one machine energizing circuit while opening the other machine energizing circuit, thermionic means energized by the signal frequency for starting the motor means, and conductive means connecting the motor, its starting means and switches with associated elements to the current source.

JAMES T. GATES.

REFERENCES CITED

The following references are of record in the file of this patent:

UNITED STATES PATENTS

| Number | Name | Date |
|---|---|---|
| 1,547,144 | Jensen | July 21, 1925 |
| 1,834,886 | Barton | Dec. 1, 1931 |
| 1,859,665 | Golden et al. | May 24, 1932 |
| 1,909,765 | Jenkins et al. | May 16, 1933 |
| 1,972,904 | Pritchard | Sept. 11, 1934 |
| 1,989,963 | Baker | Feb. 5, 1935 |
| 2,014,418 | Tasker | Sept. 17, 1935 |
| 2,106,957 | Nielsen | Feb. 1, 1938 |
| 2,116,314 | Jenkins et al. | May 3, 1938 |
| 2,270,886 | Mead | Jan. 27, 1942 |
| 2,289,833 | Fuller et al. | July 14, 1942 |